(12) United States Patent
Bender et al.

(10) Patent No.: US 7,259,355 B2
(45) Date of Patent: Aug. 21, 2007

(54) ENGINE WELDER WITH FULL ACCESS

(75) Inventors: David J. Bender, Chardon, OH (US); Bryce Muter, Eastlake, OH (US); David E. Osicki, Leroy Township, OH (US)

(73) Assignee: Lincoln Global, Inc., City of Industry, CA (US)

(*) Notice: Subject to any disclaimer, the term of this patent is extended or adjusted under 35 U.S.C. 154(b) by 91 days.

(21) Appl. No.: 10/988,135

(22) Filed: Nov. 15, 2004

(65) Prior Publication Data

US 2006/0102693 A1    May 18, 2006

(51) Int. Cl.
*B23K 9/10* (2006.01)

(52) U.S. Cl. ............................ 219/133; 290/1 A

(58) Field of Classification Search ............... 219/133; 290/1 A, 1 R; 312/283
See application file for complete search history.

(56) References Cited

U.S. PATENT DOCUMENTS

| | | | |
|---|---|---|---|
| 3,304,485 A * | 2/1967 | Manz | 363/100 |
| 4,698,975 A * | 10/1987 | Tsukamoto et al. | 60/721 |
| 5,599,470 A * | 2/1997 | Peotter et al. | 219/133 |
| 5,624,589 A | 4/1997 | Latvis | |
| 5,789,828 A * | 8/1998 | Tremaine et al. | 307/64 |
| 5,928,535 A | 7/1999 | Trinkner | |
| 6,674,046 B2 | 1/2004 | Bankstahl | |
| 6,989,509 B2 * | 1/2006 | Silvestro | 219/133 |
| 6,992,265 B2 * | 1/2006 | Bender et al. | 219/133 |
| 2004/0182846 A1 | 9/2004 | Silvestro | |

* cited by examiner

*Primary Examiner*—Kevin P. Kerns
(74) *Attorney, Agent, or Firm*—Fay Sharpe LLP

(57) ABSTRACT

A cabinet for an engine welder including an output power module driven by a DC input signal from a rectifier having an AC input signal created by an alternator rotated by an internal combustion engine. The cabinet has a front panel with a pivotally mounted door with an open and closed position. The door is used to expose a large accessible compartment. This compartment contains major components of the welder, such as the rectifier, the power source module, the control module of the engine and a support structure for the capacitors and diodes used to control the alternator.

44 Claims, 6 Drawing Sheets

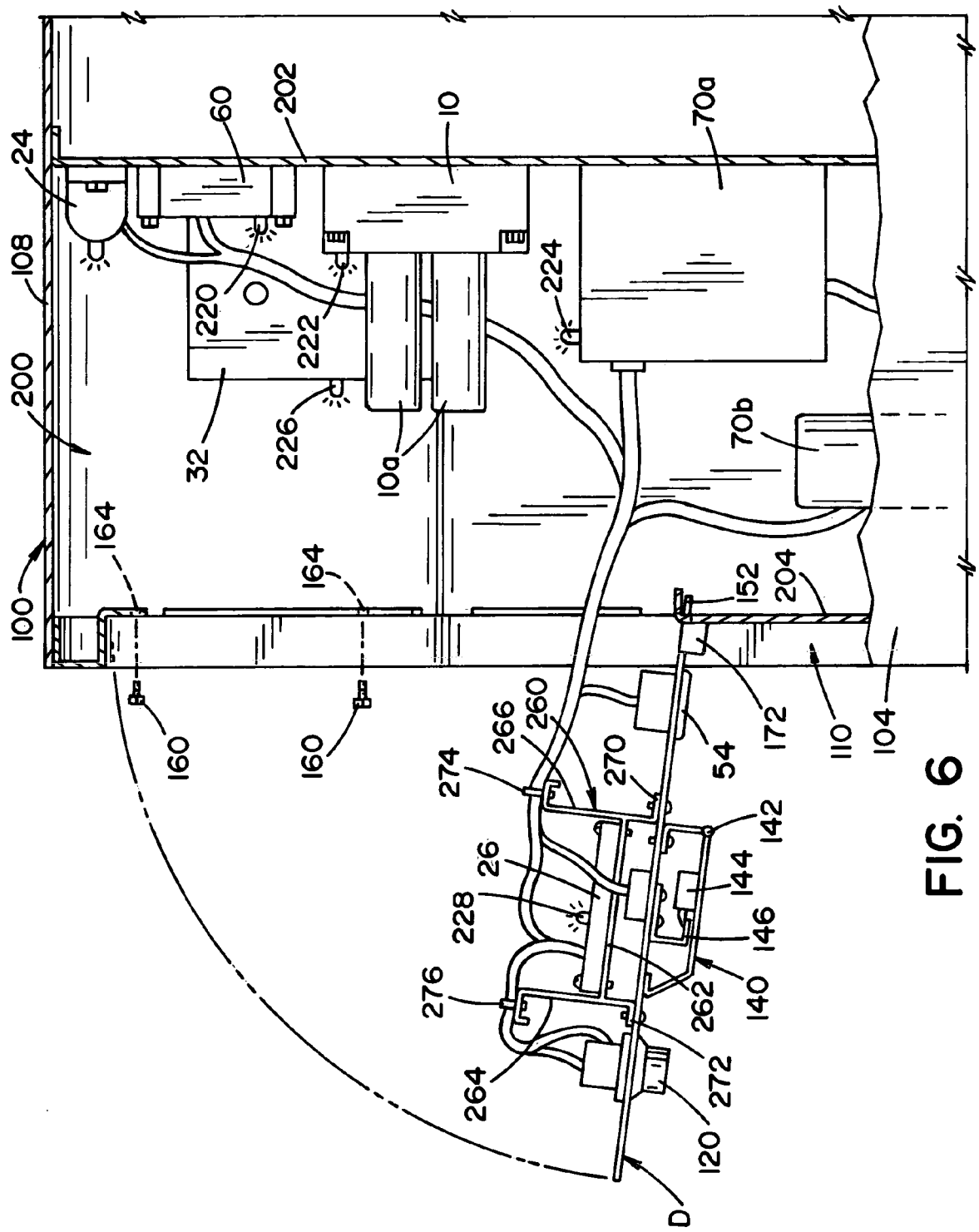

ENGINE WELDER WITH FULL ACCESS

The present invention relates to electric arc welding and more particularly to a novel engine welder with full access to the components requiring periodic attention.

INCORPORATION BY REFERENCE

The present invention relates to an engine driven welder having a surrounding outer, sheet metal cabinet, such as illustrated in U.S. Pat. No. 6,989,509. This cabinet has two parallel side walls, a back panel and a front panel, with the front panel including manually operated devices for controlling the welding operation and operation of the internal combustion engine driving the alternator. This patent publication is incorporated by reference herein. Cabinet for engine driven welders are common in the welding industry and representative cabinet structures are illustrated in Peotter U.S. Pat. No. 5,599,470; Latvis U.S. Pat. No. 5,624,589; Trinkner U.S. Pat. No. 5,928,535; and Bankstahl U.S. Pat. No. 6,674,046. These patents are also incorporated by reference herein to illustrate background cabinets to which the present invention is directed.

BACKGROUND OF INVENTION

It is common practice to perform complex welding operations in the field instead of in a factory; therefore, a large segment of the electric arc welding business has been directed to freestanding, movable welders. In practice, such welders are commonly a power source having a rectified input driven by an AC signal from an alternator rotated by an internal combustion engine. Thus, the internal combustion engine provides the electrical power for the welder, so the welder can be moved to remote locations in the field without concern for the existence of commercial line voltage. With the popularity of an engine driven welder, substantial development activity has been directed to improving the unit so it is easily operated and customer friendly. This objective is reached by facilitating minor maintenance and allowing placement or repair of defective components. The rectifier, engine and alternator unit, power source and various components of the portable arc welder are contained in a surrounding housing where the front panel of the housing includes gages, input devices, such as switches, and output devices, such as display units for amperes and voltage. However, when the engine welder requires maintenance, it must be returned to the home facility so the cabinet can be removed to gain access to the various components. To repair the engine welder, the cabinet panels must be removable or disassembled. Components requiring the most frequent attention are not easily accessible even with the cover panel removed. One slight improvement in the cabinet structure of an engine welder has been to provide a pivoted door on the front panels. The various gages and input devices are mounted onto this pivoted door. The maintenance of the door mounted components or devices can be done by pivoting the door. This allows access from either the back side or the front side. Thus, door mounted components are easily repaired by opening the door. This is an advantage of units sold by The Lincoln Electric Company of Cleveland, Ohio; however, this pivoted front panel door does not address the real problem of accessibility for the many operating components of the engine welder.

THE PRESENT INVENTION

In accordance with the present invention, a standard engine welder is provided with a novel surrounding cabinet that houses the output power module driven by a DC input signal from a rectifier having an AC input signal created by an alternator rotated by an internal combustion engine. The power source is in the form of a module with power switches and a control circuit for the switches. The engine includes a control module and a set of gages, such as fuel gage, oil gage and temperature gages. The alternator excitation is provided by a capacitor and diodes associated with the internal output windings of the alternator. The cabinet has two parallel side walls, a back panel and a front panel. In accordance with the present invention, one of the side walls and the back panel are generally closed so the engine welder can be mounted close to an obstruction wall adjacent both one side wall and the back panel. To convert the engine welder into a customer friendly unit, the front panel has a pivotally mounted door with an open and closed position where the door exposes a large accessible compartment when the door is in its open position. The accessible compartment contains at least two of the items requiring maintenance, such as the rectifier, the power module with the exposed switches and control circuit, the control module for the engine and a support structure for the external capacitors and diodes associated with the alternator. By using the present invention, the accessible compartment is occupied by these several items or components whereby pivoting the front panel door downward, not only allows attention to devices, such as manual inputs and display units mounted on the door, but also the main components of the engine welder. The accessible components are those which may require repair or replacement. Such components can be reached from the front of the engine welder. Thus, by merely opening a pivoted door on the front panel of the cabinet around the engine welder, the door mounted components can be repaired and maintained as in the past; however, the various components constituting the major elements of the engine welder are accessible. By this novel structure, most service and repair of the engine welder may be performed at the front of the welder so the welder need not be moved to reach these components. It has been found that even if the engine welder is mounted in a pickup truck, in the corner of a factory or in another close quarters, the front panel is always uncovered. It is a novel concept where a movable door allows an operator to easily access a large compartment housing major components of an engine welder. This greatly improves the ability to troubleshoot and service the engine welder without requiring removal of the cabinet or panels thereof or reorientation of the welder.

In accordance with the present invention, there is provided a cabinet for an engine welder, which engine welder is constructed to have the power source module with power switches and a control circuit board for the switches, an engine control circuit board with a set of gages and the capacitor and diodes for an alternator all assembled into a large compartment directly behind the pivoted door on the front panel of the engine welder. Also, the output rectifier and the output resistor are also mounted in the same compartment. As the door is pivoted from a closed position to an open position, components contained in the large compartment are exposed. The compartment contains the items necessary for electrical troubleshooting and repair of the engine welder. In accordance with the preferred embodiment of the invention, the accessible compartment behind the pivoted front panel door includes the rectifier, the module constituting the power source with its switches and control circuit board for the switches, a control circuit board for the engine itself, the capacitors and diodes associated with the output windings of the alternator and the output resistor connected between the output terminals of the power source. This is the preferred embodiment of the invention; however, the engine welder can be improved by having two or more of these basic components of the engine welder accessible by merely opening the access door on the front panel of the welder.

In accordance with another aspect of the present invention, the power module is a chopper with two output terminals for the welding operation, wherein the output terminals include an output resistor between the terminals. This resistor is one of the components in the accessible compartment behind the pivoting door.

A fastening element for mounting each of the gages of the engine onto the pivoted door allows the gages to be repaired by merely pivoting the door downwardly. This feature is in combination with the door that provides access to a compartment containing the major components of the engine welder. The pivoted door is removable and has a projecting stop member that engages the cabinet when the door is in the open position to hold the door generally horizontal when it is opened.

In accordance with another aspect of the invention, a pivoted door on the front panel carries certain devices and allows access to a large component compartment is combined with a slidable battery tray below the pivoted door. Slidable battery trays are not new; however, they are located in the back of the welder to be near the engine. To replace and charge the battery an operator must maneuver in the space behind the engine welder. This is not possible when the welder is mounted in the bed of a pickup truck or is in some other confining location. By combining a front slidable battery tray with the front panel pivoted door allowing access to the components on the door as well as to the components in a central compartment, the engine welder is operable and maintainable from the front panel of the engine welder. This feature has not been accomplished before because the major components were assembled throughout the cabinet and required access at diverse locations.

In summary, the invention involves an engine welder with a cabinet having universal accessibility from the front of the engine welder which is always open to an operator or a repair person. This is a substantial improvement in the engine welder and provides a vastly improved service/repair procedure for the welder.

A primary object of the present invention is the provision of an engine welder having a cabinet with a front panel door to provide access to a compartment and the concept of mounting major components of the engine welder in this compartment and not spaced throughout the cabinet.

Yet another object of the present invention is the provision of a cabinet for an engine welder, as defined above, which cabinet has accessibility to minor components mounted on the pivoted door, as well as major components located in the compartment behind the front panel.

Still a further object of the present invention is the provision of a cabinet for an engine welder, as defined above, which cabinet is easy to manufacture and provides improved service/repair capabilities by employing a novel cabinet design and component location.

These and other objects and advantages will become apparent from the following description taken together with the accompanying drawings.

PREFERRED EMBODIMENT

Figure 1:
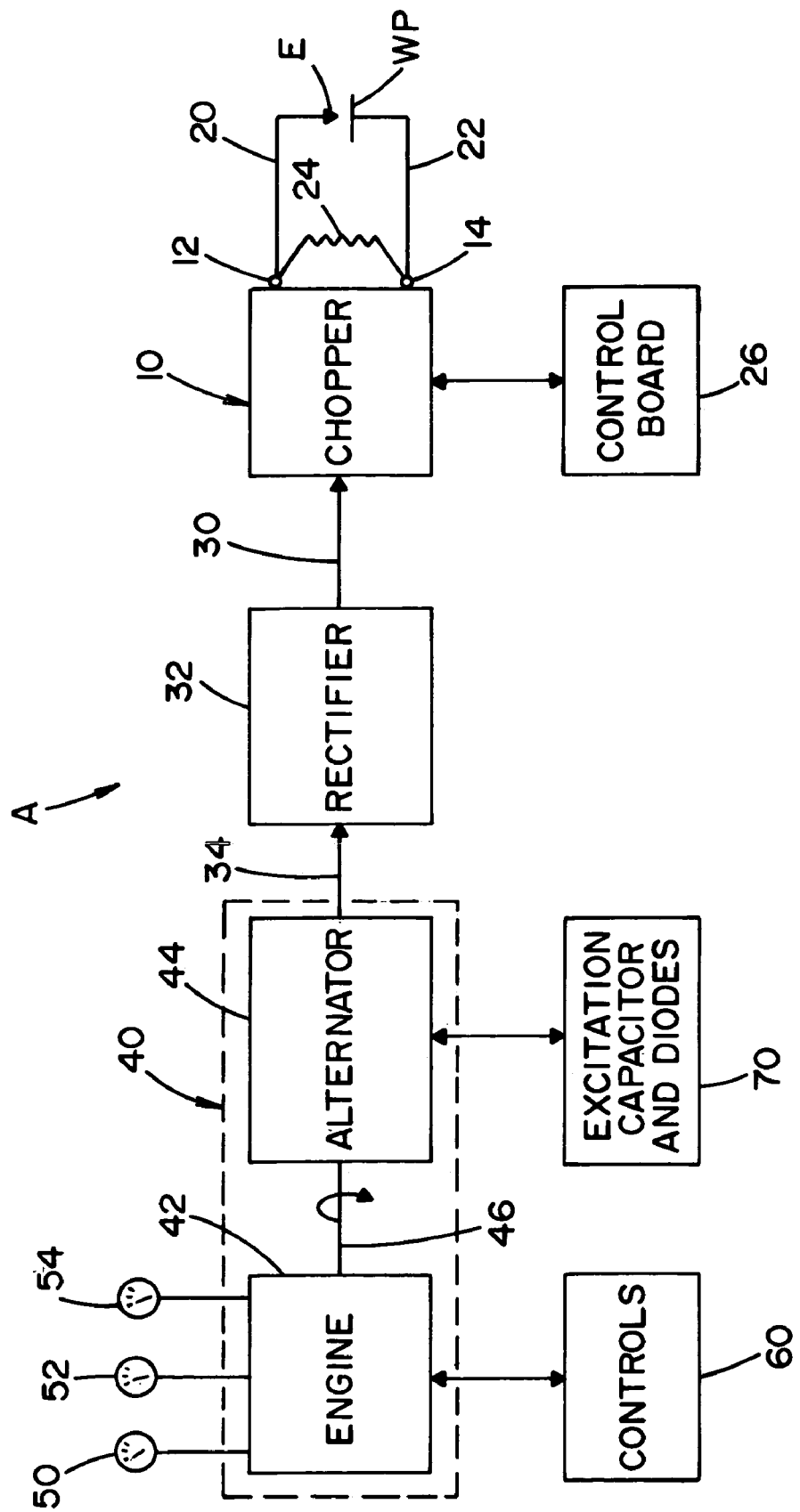
FIG. 1 is a block diagram illustrating schematically the components of an engine welder.

A schematic layout of the components of the standard engine welder are shown in FIG. 1 wherein engine welder A includes output power module 10, shown as a chopper, with output terminals 12,14 to direct a voltage across leads 20, 22 for creating a welding operation between electrode E and workpiece WP. Operation of the chopper is controlled by a dedicated control PC board represented as board 26, which constitutes one component which may require service and/or replacement. Chopper 10 is powered by a DC voltage in output line 30 from rectifier 32, which rectifier is another major component which may require service and/or replacement. Rectifier 32 receives AC input power in line 34 from an integral mechanism 40 comprising an internal combustion engine 42 driving a standard alternator 44 by a rotating shaft 46. As the engine drives shaft 46, alternator 44 creates an AC output power in line 34 which is input power to the rectifier. This power is rectified into a DC power in line 30 to form the input power to chopper 10. Welding between electrode E and workpiece WP is under the control of the circuitry in a standard controller control board 26. Engine 42 includes a set of gages, illustrated as fuel gage 50, temperature gage 52 and oil pressure gage 54. Operation of engine 42 is monitored and controlled by an appropriate engine control 60. This control also is a major component of welder A which may require service and/or replacement. In a like manner, and excitation capacitor and diodes 70 are used by the windings of alternator 44 to provide field excitation power. These capacitors and diodes are also components which may require replacement. As illustrated in FIG. 1, a common engine welder includes several major items or components requiring service or replacement. These items are chopper 10, resistor 24, power source control board 26, rectifier 32, engine control board 60 and capacitors and diodes 70 of alternator 44. In the past, these components have been located within the cabinet housing engine welder A at various locations dictated by the architecture used and the available space in and around the constituent mechanisms of the welder. The present invention relates to the concept of centralizing the location of the major components in a large compartment behind a door in the front panel of engine welder A.

Figure 2:
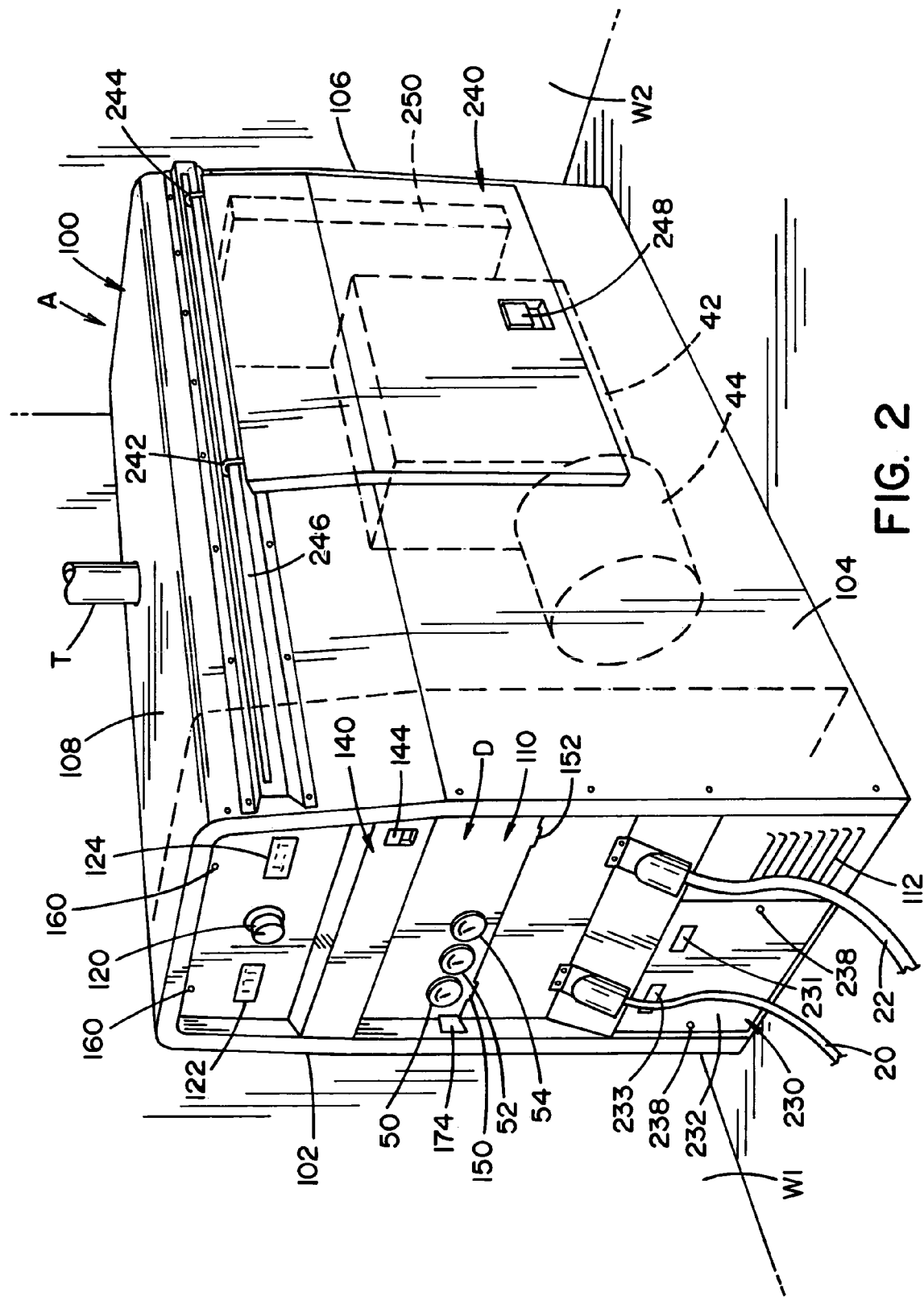
FIG. 2 is a side pictorial view showing the preferred embodiment of the present invention with certain internal components illustrated in phantom lines.
Figure 3:
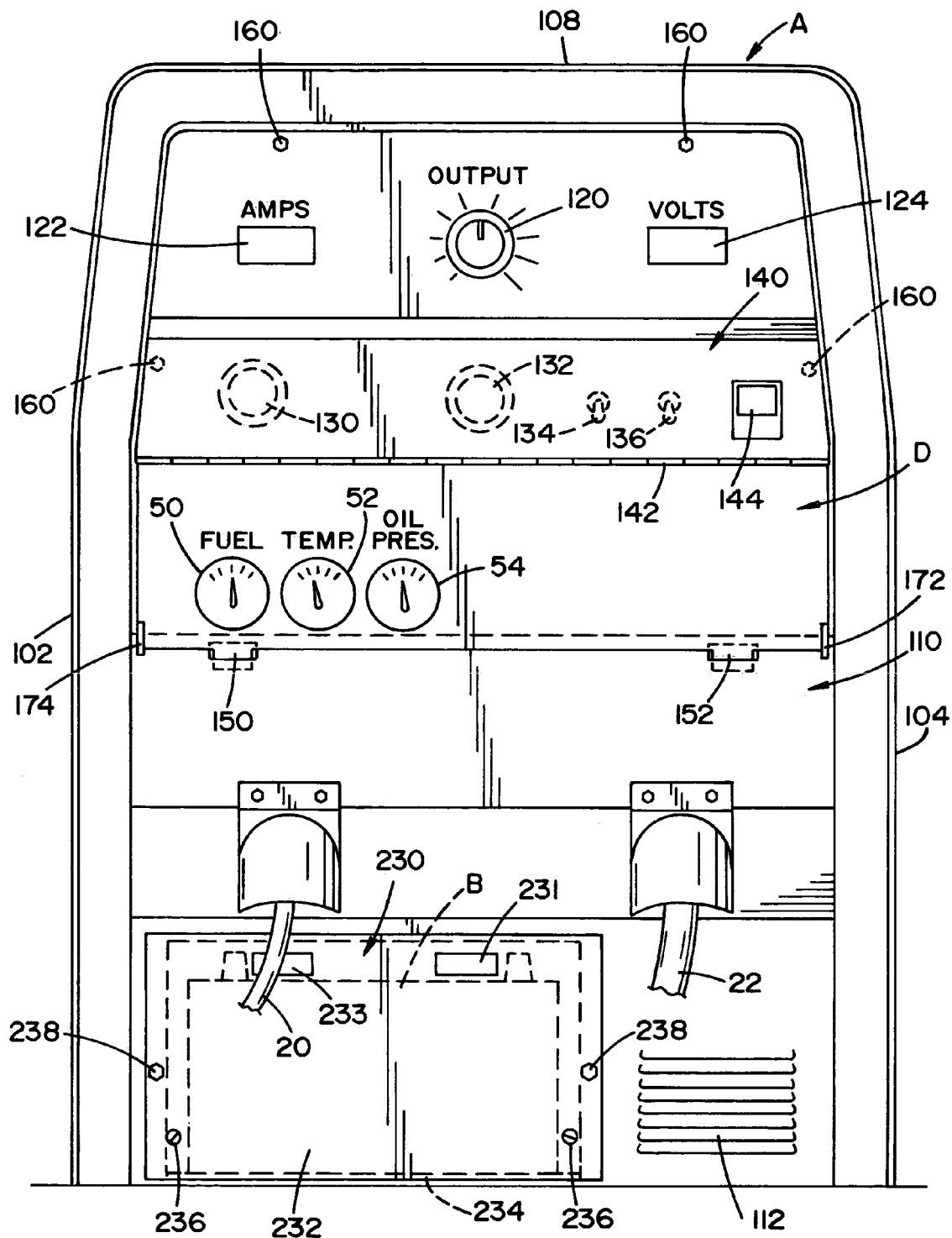
FIG. 3 is a front view of the preferred embodiment of the present invention.
Figure 4:
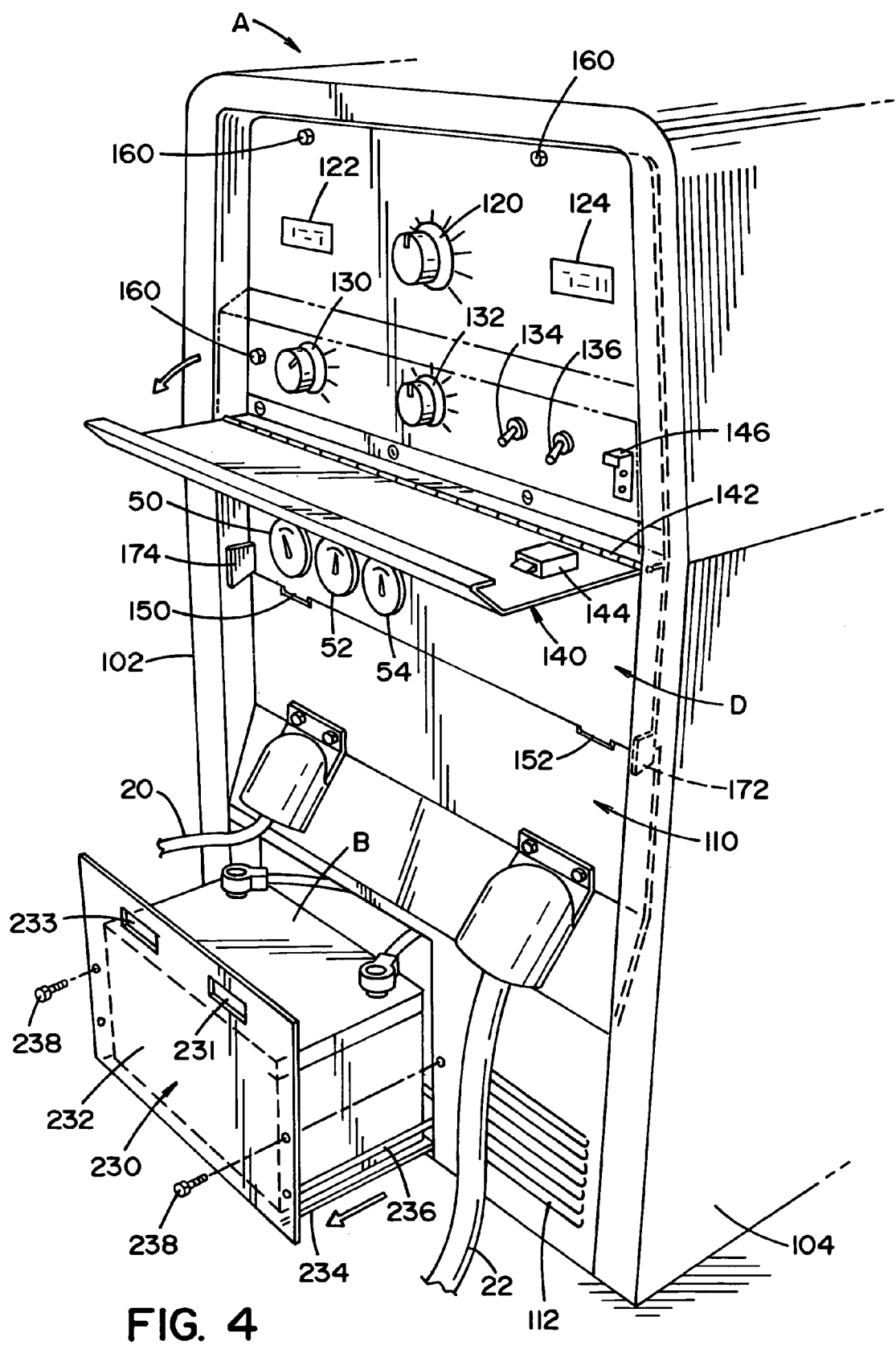
FIG. 4 is a partial side pictorial view showing two features of the preferred embodiment of the present invention.
Figure 5:
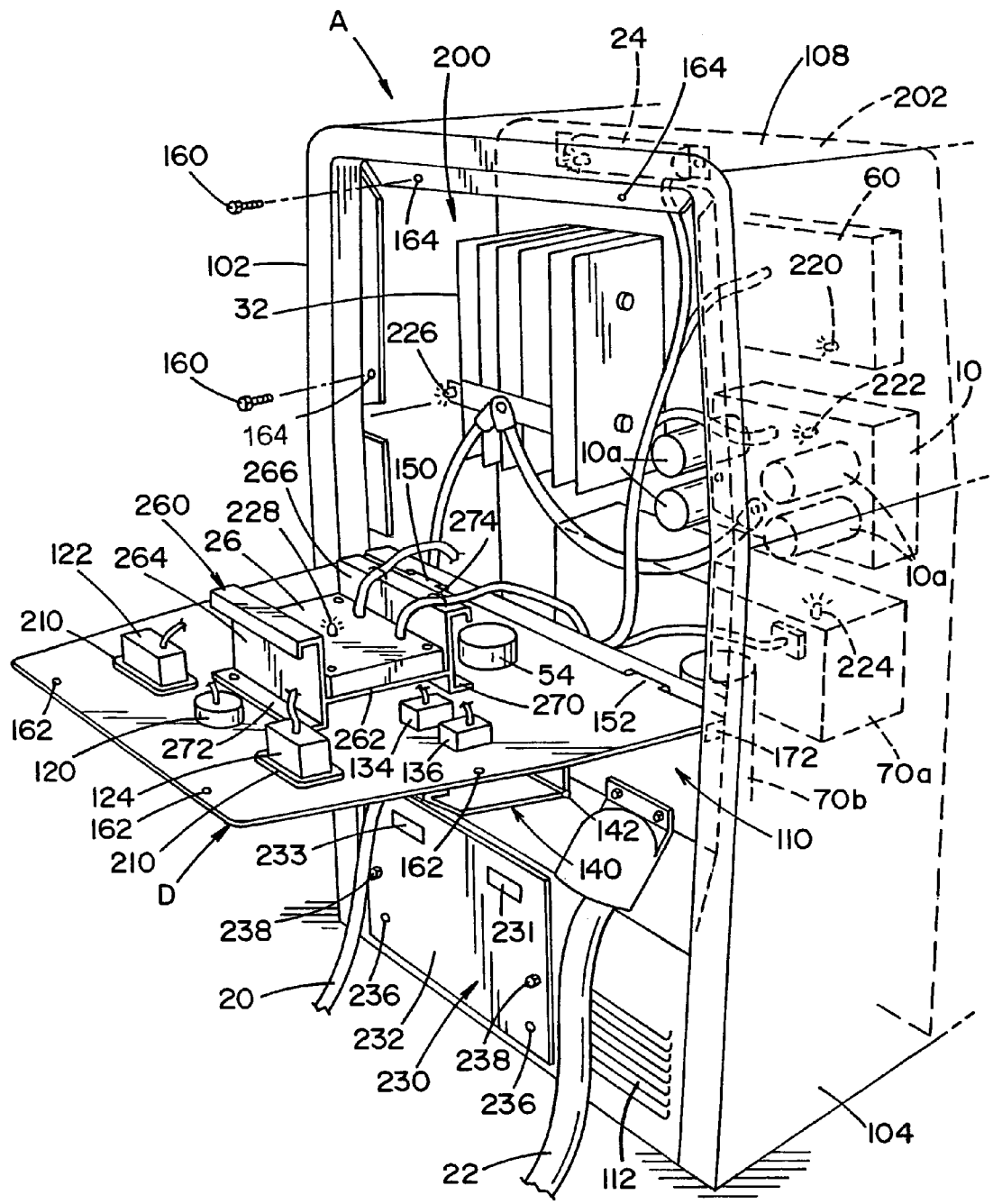
FIG. 5 is a view similar to FIG. 4 illustrating another feature of the preferred embodiment of the present invention; and, FIG. 6 is a side cross-sectional view of the compartment and door used in practicing the preferred embodiment of the present invention.

Referring now to FIGS. 2-5, engine welder A includes a novel cabinet 100 with parallel side walls 102, 104 and a back panel 106. For the internal combustion engine, there is an upwardly extending exhaust T protruding through top 108 of cabinet 100. In accordance with the invention there is provided a novel front panel 110 having common air louvers 112 and door D pivoted from a vertical closed position shown in FIGS. 2-4 and a horizontal open position shown in FIG. 5. Input devices, such as a knob 120 to adjust the output of the welder is mounted on door D. Display devices 122, 124 are also fastened to door D for display from the front side of the door as shown in FIGS. 2-4 and access from the back side of the door as shown in FIG. 5. Door D also carries certain control knobs for the welding operation, such as weld mode knob 130 and arc control knob 132. These knobs are minor components and form inputs to control board 26 of chopper 10. Furthermore, the door includes weld terminal toggle switch 134 and wire feed toggle switch 136. Devices 130, 132 and switches 134, 136 are selectively covered for aesthetic purposes by auxiliary door 140 pivotally mounted on the front surface of door D by piano hinge 142 so that latch 144 coacts with catch 146 to cover devices 130, 132 and switches 134, 136. The closing of door 140 is best shown in FIGS. 2-3. This door is opened to expose elements 130, 132, 134 and 136, as shown in FIG. 4. Door D is releasably secured on front panel 110 by spaced insert tabs forming hinges 150, 152. These hinges allow door D to pivot from the vertical position shown in FIG. 4 to the horizontal position shown in FIG. 5. Screws 160 extend through openings 162 into receptacle holes 164 for locking door D in the vertical or closed position. By removing these screws, the door is pivoted to the horizontal, opened position shown in FIG. 5. It is supported in the open position by two outwardly protruding stops 172, 174. These stops engage the front surface of door D to hold the door horizontally as shown in FIG. 4.

Door D and auxiliary door 140 have been used in prior engine welders; however, in accordance with the invention, door D exposes a large compartment 200 used to mount various major components of the welder. Consequently, these major components are readily accessible from the front panel for repair and/or replacement. As shown in FIG. 5, accessible compartment 200 is the assembled location for chopper 10, with its switches 10a, resistor 24, rectifier 32, engine control board 60 and the combined capacitors and diodes 70, which are divided into two components 70a, 70b. By providing a large volume compartment 200 adjacent front panel 110 the various major components are mounted and structurally fixed in the compartment. They are accessible through a front opening when door D is moved to the horizontal open position, as shown in FIG. 5. Consequently, all of the major items are located in compartment 200 so they can be easily attended to from the front of welder A. This is a substantial advance in the engine welder art.

As in the prior welders, pivoted door D has fastener elements 210 for holding input 120 and display devices 122, 124 so they are visible from the front surface of door D and maintained from the back surface of the door. A variety of fastening elements can be used for device 120 and display devices 122, 124. The same is true of gages 50, 52 and 54. In a like manner, fastening elements locate switches 134, 136 onto door D for access when the door is in the horizontal, opened position. Controls 120, 130, 132 are directly connected to the power source control board 26 on bracket 260. This board is accessible from the back surface of door D when the door is in its open position. Consequently, when the door is moved to its horizontal position, the items mounted on the door are easily accessible for maintenance and repair. Likewise, major components of the welder in compartment 200 are also readily accessible.

The invention involves location of major components in large compartment 200 behind door D so these components are readily accessible at the same time the elements or components on the back of door D are accessible. This is a major improvement in the engine welder technology in that there is complete access from the front of cabinet 100. As a further feature of the invention, the various major components include diagnostic lights 220-228. These lights are illuminated to signal when a parameter of a specific component requires attention. Although only one light is shown for each of the various items or components, in practice, one light is provided on some components and several lights are available on other components. When door D is opened, the lights visually inform the operator the components in compartment 200 requiring attention and what defect or condition has developed. Such diagnostic lights can take a variety of forms; however, a LED is now employed. The lights can be mounted on the components or in a separate display bank.

An engine welder is constructed in accordance with the invention is provided with another feature. Battery tray 230 supports battery B behind vertical cover plate 232 on shelf 234 having guide rails 236. A feature of the invention involves the front mounting of battery tray 230 which tray is normally located in back of the welder and thus requires access from behind the welder. This objectionable back access is overcome by the present invention with the tray 230 on front panel 110. Screws 238 support battery B in the retracted position shown in FIG. 5 by sliding tray 230 on rails 236 by finger holes 231, 233.

Access to engine 42 and alternator 44 is through door 240 in side wall 104 of cabinet 100. This door slides on hangers 242, 244 mounted to move along rail 246. Door 240 is released by latch 248 and shifted toward front panel 110 on rail 46 to expose the engine and alternator together with radiator 250 facing air louvers (now shown) in back panel 106. In this manner, back panel 106 has only air louvers, while side wall 102 has no openings. Thus, engine welder A can be mounted into a corner formed from walls W1, W2 as shown in FIG. 2, so only front panel 110 and side wall 104 are clear. In this manner, door D with its auxiliary door 140 and battery tray 230 all are accessible from the front panel 110. Side door 240 is the only other routine access into cabinet 100. The unique component arrangement and limited access areas provide the ability to move or mount the welder in tight quarters without hindering maintenance and repair of the major components. The invention is the accessibility of all major components from front panel 110 of welder A.

A side view of compartment 200 and door D is shown in FIG. 6 where the back wall 202 for mounting components 10, 24, 32, 60 and 70a if a part of the compartment. Capacitor 70b is mounted on the bottom wall of compartment 200. The compartment also has front wall 204 with flange 206 to engage the tab of hinges 150, 152. Wall 204 also coacts with stops 172, 174 to hold door D in its horizontal position. Controller board 26 for chopper 10 is mounted in an upstanding bracket 260 having a horizontal plate 262 for attaching the module to the door and vertical legs 264, 266 extending from lower bolted supports 270, 272 to upper harness clips 274, 276. The side view of FIG. 6 is combined with the showings of FIGS. 2-5 to illustrate the location of various major components of welder A in compartment 200 and relationship of the compartment with both the pivoted door D and auxiliary door 140. Changes can be made in the arrangement of components and the number of components in compartment 200; but it is preferred that compartment 200 and door D have any component which may require service or replacement.

The invention claimed is:

1. A cabinet for an engine welder comprising an output power module driven by a DC input signal from a rectifier having an AC input signal created by an alternator rotated by an internal combustion engine, said output power module being in the form of a module with power switches and a control circuit for said switches, said engine including a control module and a set of gages and where said alternator is controlled by capacitors and diodes associated with output windings of the alternator, said cabinet having two side walls, a back panel and a front panel with one of said side walls and said back panel being generally closed, said front panel having a pivotally mounted first door with an open and closed position, an auxiliary door pivoted on said first door to expose weld control adjusting devices carried on said first door, and a fastening element, said first door exposing an accessible compartment when pivoted to its open position, said accessible compartment containing at least two items from a group consisting of said rectifier, said output power module exposing said switches and control circuit, said control module of said engine, and a support structure for said capacitors and diodes, said fastening element for mounting each gage of said set of gages onto said pivoted door, said gages being oriented for visual inspection from a first surface of said first door when said first door is in its closed position closing said accessible compartment.

2. A cabinet as defined in claim 1 wherein said accessible compartment contains all of said items.

3. A cabinet as defined in claim 2 wherein said output power module is a chopper with two output terminals for connection to a welding station.

4. A cabinet as defined in claim 3 wherein said chopper includes a resistor between said terminals.

5. A cabinet as defined in claim 4 wherein said resistor is in said accessible compartment.

6. A cabinet as defined in claim 1 wherein said accessible compartment contains a majority of said items.

7. A cabinet as defined in claim 6 wherein said output power module is a chopper with two output terminals for connection to a welding station.

8. A cabinet as defined in claim 7 wherein said chopper includes a resistor between said terminals.

9. A cabinet as defined in claim 8 wherein said resistor is in said accessible compartment.

10. A cabinet as defined in claim 1 wherein said output power module is a chopper with two output terminals for connection to a welding station.

11. A cabinet as defined in claim 10 wherein said chopper includes a resistor between said terminals.

12. A cabinet as defined in claim 11 wherein said resistor is in said accessible compartment.

13. A cabinet as defined in claim 11 wherein said first door includes a projecting stop member engaging said cabinet when said first door is in said open position.

14. A cabinet as defined in claim 11 wherein said cabinet includes a battery access tray slidably mounted below said first door and on said front panel.

15. A cabinet as defined in claim 11 including an access door on said second side wall of said cabinet movable to an open position exposing at least a portion of said engine.

16. A cabinet as defined in claim 10 wherein said first door is removable from said cabinet.

17. A cabinet as defined in claim 10 wherein said first door includes a projecting stop member engaging said cabinet when said first door is in said open position.

18. A cabinet as defined in claim 17 including an access door on said second side wall of said cabinet movable to an open position exposing at least a portion of said engine.

19. A cabinet as defined in claim 10 wherein said cabinet includes a battery access tray slidably mounted below said first door and on said front panel.

20. A cabinet as defined in claim 19 including an access door on said second side wall of said cabinet movable to an open position exposing at least a portion of said engine.

21. A cabinet as defined in claim 10 including an access door on said second side wall of said cabinet movable to an open position exposing at least a portion of said engine.

22. A cabinet as defined in claim 1 wherein said first door is removable from said cabinet.

23. A cabinet as defined in claim 22 wherein said first door includes a projecting stop member engaging said cabinet when said first door is in said open position.

24. A cabinet as defined in claim 23 wherein said cabinet includes a battery access tray slidably mounted below said first door and on said front panel.

25. A cabinet as defined in claim 22 wherein said cabinet includes a battery access tray slidably mounted below said first door and on said front panel.

26. A cabinet as defined in claim 1 wherein said first door includes a projecting stop member engaging said cabinet when said first door is in said open position.

27. A cabinet as defined in claim 1 wherein said cabinet includes a battery access tray slidably mounted below said first door and on said front panel.

28. A cabinet as defined in claim 1 including an access door on said second side wall of said cabinet movable to an open position exposing at least a portion of said engine.

29. An engine welder comprising:
- an output power module including power switches and a control circuit for the switches;
- a rectifier having a DC output signal that is delivered to the output power module;
- an alternator having an AC output signal that is delivered to the rectifier;
- a capacitor associated with the alternator;
- a diode associated with the alternator;
- an internal combustion engine operatively connected to the alternator;
- a cabinet having two side walls, a back panel, a front panel, a first door and a second door, wherein one of the side walls and the back panel being generally closed, the first door pivotally mounted to the front panel and movable between a horizontal open position and a vertical closed position, the first door exposing an accessible compartment when pivoted to its open position, wherein the output power module, the rectifier, the capacitor, and the diode are mounted and structurally fixed in the accessible compartment, the second door pivotally attached to the first door; and
- a bracket attached to an inner surface of the first door, the bracket being configured to retain at least one of the output power module, the rectifier, and the alternator adjacent the inner surface of the door.

30. The engine welder of claim 29, further comprising a control module for the engine, the control module being mounted and structurally fixed in the accessible compartment.

31. The engine welder of claim 29, wherein the first door includes a stop that coacts with a wall of the cabinet to hold the first door in a horizontal position when in the open position.

32. The engine welder of claim 29, further comprising a control board for the output power module, wherein the control board attaches to the bracket.

33. An engine welder comprising:
- an output power module including power switches and a control circuit for the switches;
- a rectifier having a DC output signal that is delivered to the output power module;
- an alternator having an AC output signal that is delivered to the rectifier;
- a capacitor associated with the alternator;
- a diode associated with the alternator;
- an internal combustion engine operatively connected to the alternator;
- a cabinet housing the output power module, the rectifier, the alternator, the capacitor, the diode, and the engine, the cabinet defining an accessible compartment, at least two of the output power module, the rectifier, the capacitor, and the diode being disposed in the accessible compartment;
- a door pivotally mounted to the cabinet, the door and the cabinet being configured such that when the door is pivoted into an open position, the at least two of the output power module, the rectifier, the capacitor, and the diode are accessible to be repaired or replaced; and
- a bracket attached to an inner surface of the door, the bracket being configured to retain at least one of the output power module, the rectifier, and the alternator adjacent the inner surface of the door.

34. The welder of claim 33, wherein at least three of the output power module, the rectifier, the capacitor, and the diode are disposed in the accessible compartment.

35. The welder of claim 33, wherein each of the output power module, the rectifier, the capacitor, and the diode are disposed in the accessible compartment.

36. The welder of claim 33, wherein the door is a first door and the welder further includes an auxiliary door pivoted on the first door to expose weld control adjusting devices.

37. The engine welder of claim 33, wherein the door comprises a first door, the welder further comprising a second door pivotally attached to the first door.

38. The engine welder of claim 33, wherein the output power module is a chopper with two output terminals for connection to a welding station.

39. The engine welder of claim 33, wherein the chopper includes a resistor between the terminals.

40. The engine welder of claim 39, wherein the resistor is in the accessible compartment.

41. The engine welder of claim 33, wherein the first door is removable from the cabinet.

42. The engine welder of claim 33, wherein the first door includes a projecting stop member engaging the cabinet when the first door is in the open position.

43. The engine welder of claim 33 further comprising a battery access tray slidably mounted below the first door.

44. The engine welder of claim 33 further comprising an access door on a side wall of the cabinet movable to an open position exposing at least a portion of the engine.

* * * * *